United States Patent
Wang et al.

(10) Patent No.: US 8,271,462 B2
(45) Date of Patent: Sep. 18, 2012

(54) METHOD FOR CREATING A INDEX OF THE DATA BLOCKS

(75) Inventors: Yun-Song Wang, Tianjin (CN); Ming-Sheng Zhu, Tianjin (CN); Chih-Feng Chen, Taipei (TW)

(73) Assignee: Inventec Corporation, Taipei (TW)

( * ) Notice: Subject to any disclaimer, the term of this patent is extended or adjusted under 35 U.S.C. 154(b) by 173 days.

(21) Appl. No.: 12/965,379

(22) Filed: Dec. 10, 2010

(65) Prior Publication Data

US 2012/0150869 A1 Jun. 14, 2012

(51) Int. Cl.
 G06F 7/00 (2006.01)
 G06F 17/00 (2006.01)
(52) U.S. Cl. .......................... 707/698; 711/692
(58) Field of Classification Search .................. None
 See application file for complete search history.

(56) References Cited

U.S. PATENT DOCUMENTS

| | | | | |
|---|---|---|---|---|
| 8,171,063 | B1* | 5/2012 | Janakiraman et al. | 707/822 |
| 2007/0245119 | A1* | 10/2007 | Hoppe | 711/216 |
| 2007/0245159 | A1* | 10/2007 | Youn | 713/187 |
| 2009/0204636 | A1* | 8/2009 | Li et al. | 707/103 Y |
| 2009/0271454 | A1* | 10/2009 | Anglin et al. | 707/204 |
| 2011/0099351 | A1* | 4/2011 | Condict | 711/216 |
| 2011/0246431 | A1* | 10/2011 | Iitsuka | 707/692 |
| 2011/0246741 | A1* | 10/2011 | Raymond et al. | 711/170 |
| 2011/0307659 | A1* | 12/2011 | Hans et al. | 711/114 |

* cited by examiner

Primary Examiner — Pierre Vital
Assistant Examiner — Augustine K Obisesan
(74) Attorney, Agent, or Firm — Morris Manning & Martin LLP; Tim Tingkang Xia, Esq.

(57) ABSTRACT

An method for creating a index of the data blocks is applicable in data de-duplication procedure, includes loading an index file, the index file includes a plurality of location blocks, each location block includes a plurality of storage fields, and each storage field records a primary Hash value corresponding to the data block; performing a first Hash procedure on a primary Hash value of the data block and calculating a block number; performing a second Hash procedure on the primary Hash value in the same data block and calculating a field number; loading a location conflict list; comparing the field number with the field number in the location conflict list to search whether the same field number is stored in the location conflict list; writing the primary Hash value into the corresponding block number and the field number if the field number does not exist in the location conflict list.

3 Claims, 5 Drawing Sheets

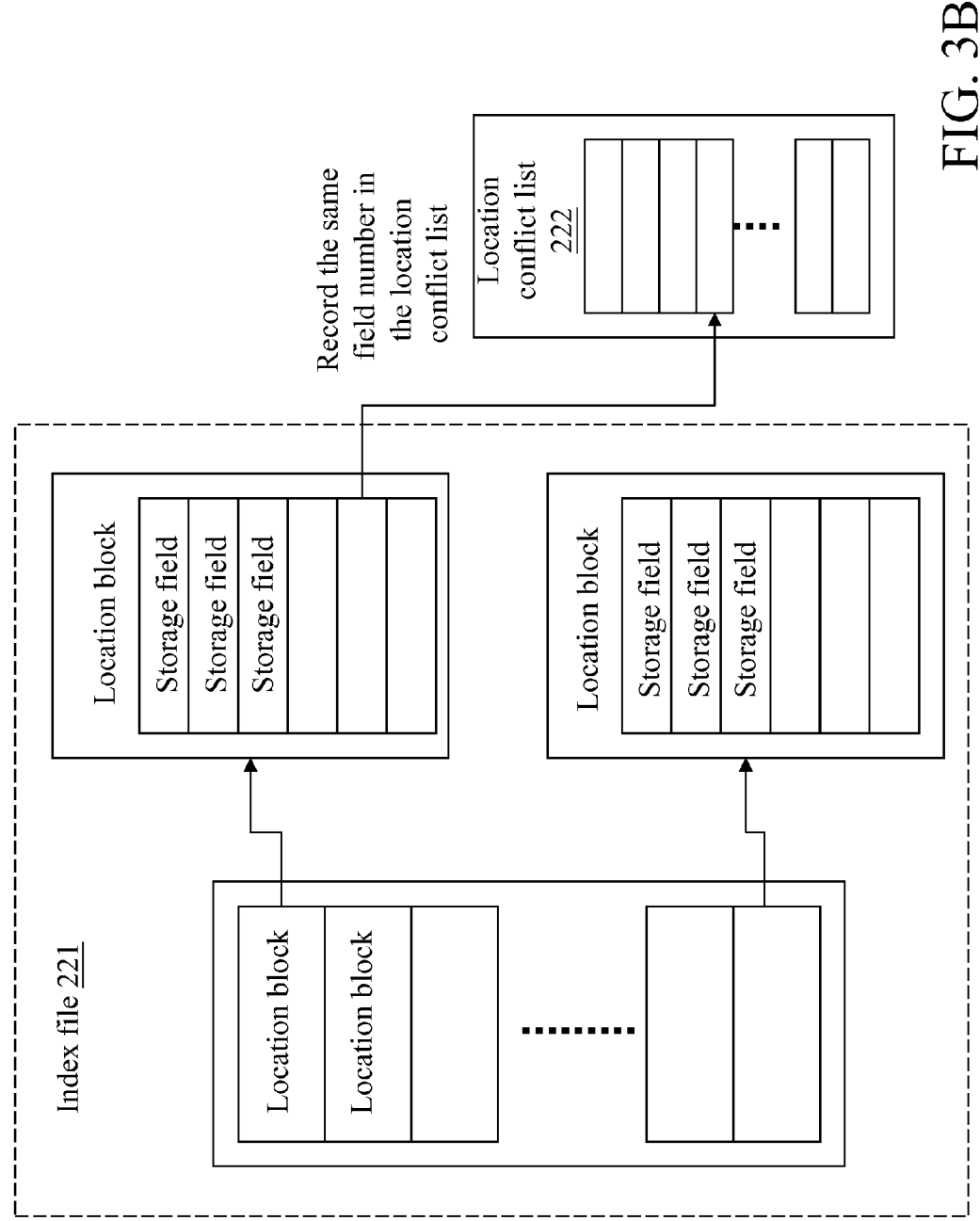

METHOD FOR CREATING A INDEX OF THE DATA BLOCKS

BACKGROUND OF THE INVENTION

1. Field of Invention

The present invention relates to an method for creating a index of the data blocks, and more particularly to an index method for creating correspondingly a data block generated after a segmentation procedure of data de-duplication, applicable in a data de-duplication procedure.

2. Related Art

Data de-duplication is a data reduction technology, which is usually used in a disk-based backup system with a main purpose of reducing a storage capacity used in a storage system. The operation mode thereof is to search for duplicate and variable-sized data blocks at different locations in different files during a certain time period. The duplicate data blocks are replaced by indicators. Since the storage system is always full of a large amount of redundant data, in order to solve the problem and save more space, the de-duplication technology naturally becomes the focus of attention. The de-duplication technology can reduce the stored data to ½₀ of the original, thus providing larger backup space, so that the backup data can be maintained in the storage system for a longer time, and a large amount of bandwidth required during offline storage is saved.

FIG. 1 is a schematic view of access of data de-duplication in the prior art. In order to effectively control the stored file data, the data block of each input file is recorded through a Hash list in a server. Hash values corresponding to the data blocks are recorded in the Hash list. Since Hash algorithm has the feature of one-way transformation, each data block necessarily has only one group of unique Hash values. Through this feature, the de-duplication procedure regards data blocks having the same Hash value as same data blocks, so only one data block needs to be stored in a storage device and the corresponding relation of the same data blocks in different files is recorded.

However, with the increasing data quantity, the length of the Hash list increases accordingly, so the memory-loading time of the Hash list and the time for searching the Hash list are also increased.

SUMMARY OF THE INVENTION

In view of the above problems, the present invention is an method for creating a index of the data blocks, applicable in a data de-duplication procedure, which creates a corresponding index file for a data block generated after a segmentation procedure of data de-duplication.

In order to achieve the above objective, the method for creating a index of the data blocks comprises: loading an index file, in which the index file comprises a plurality of location blocks, each location block further comprises a plurality of storage fields, and each storage field records a primary Hash value corresponding to the data block; performing a first Hash procedure on a primary Hash value of the data block and calculating a block number; performing a second Hash procedure on the primary Hash value in the same data block and calculating a field number; loading a location conflict list; comparing the field number with the field number in the location conflict list to search whether the same field number is stored in the location conflict list; and writing the primary Hash value into the corresponding block number and the field number if the field number does exist in the location conflict list.

A hierarchical index file according to the present invention is used to record the location of the data blocks, so as to increase an access efficiency of searching for index files in a memory (or a hard disk) in a data de-duplication procedure.

BRIEF DESCRIPTION OF THE DRAWINGS

The present invention will become more fully understood from the detailed description given herein below for illustration only, and thus are not limitative of the present invention, and wherein:

FIG. 3B is a schematic flow chart of an architecture of an index file according to the present invention.

DETAILED DESCRIPTION OF THE INVENTION

Figure 1:
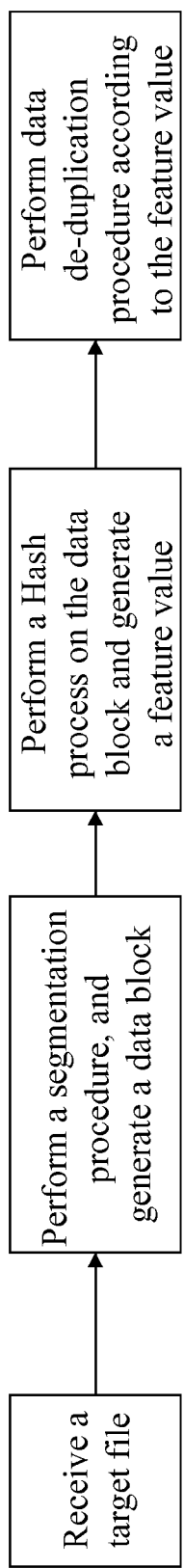
FIG. 1 is a schematic view of access of data de-duplication in the prior art.
Figure 2:
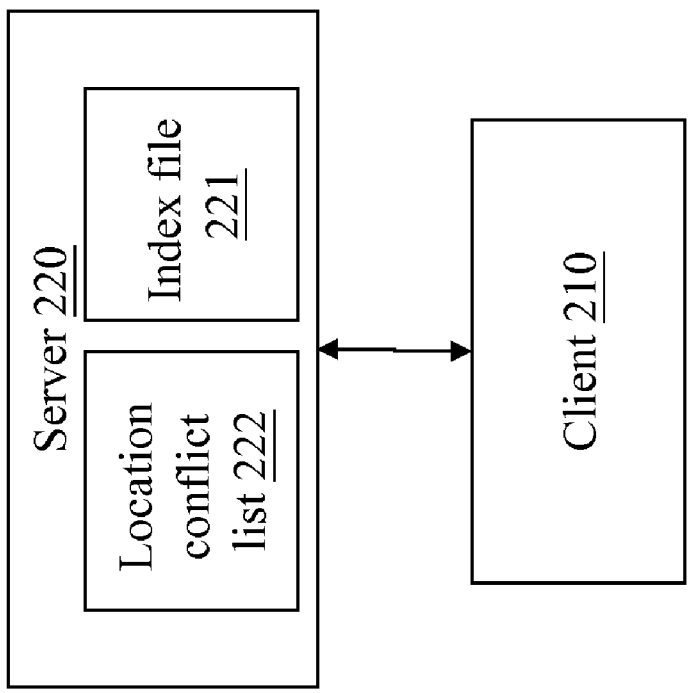
FIG. 2 is a schematic view of an architecture according to the present invention.

FIG. 2 is a schematic view of an architectural according to the present invention. The present invention comprises a client 210 and a server 220. The client 210 may be connected to the server 220 through the Internet or an intranet, or the client 210 and the server 220 can also operate on the same computer at the same time. The client 210 is used for performing a data de-duplication procedure on an input file, and generates an index file 221 of data blocks of the corresponding input file through the server according to the present invention.

Figure 3A:
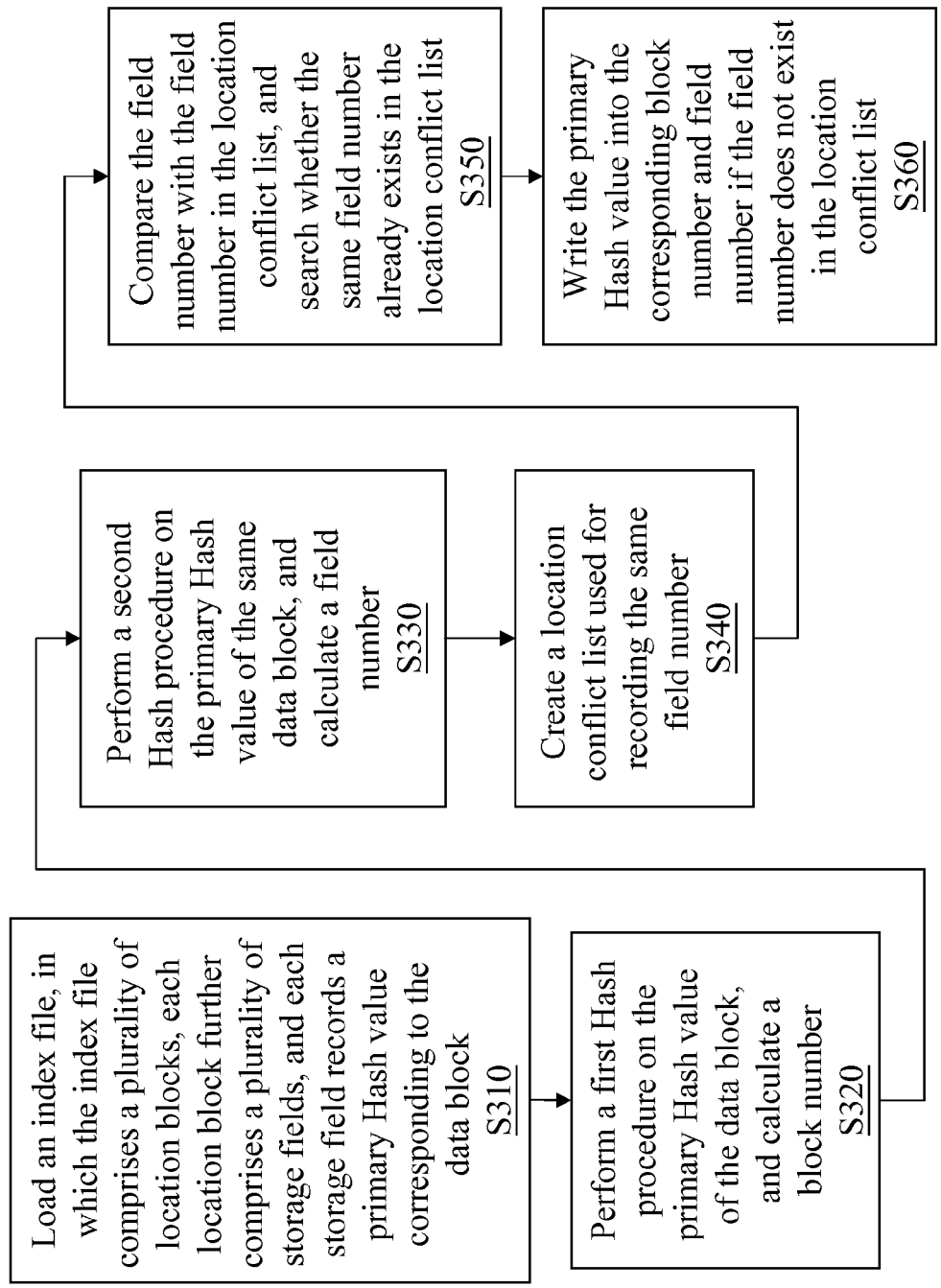
FIG. 3A is a schematic flow chart of creating an index file according to the present invention.

The index file 221 and a location conflict list 222 are stored in the server 220. The index file 221 records Hash values of multiple groups of data blocks. In order to improve a search efficiency of the index file 221 and reduce an access time of the index file 221 in a memory or a cache, a method for creating the index file 211 is provided. Referring to FIGS. 3A and 3B at the same time, FIG. 3A is a schematic flow chart of creating an index file according to the present invention, and FIG. 3B is a schematic view of an architecture of the index file according to the present invention. The method comprises the following steps.

In S310, an index file is loaded. The index file comprises a plurality of location blocks, each location block further comprises a plurality of storage fields, and each storage field records a primary Hash value corresponding to the data block.

In S320, a first Hash procedure is performed on the primary Hash value of the data block, and a block number is calculated.

In S330, a second Hash procedure is performed on the primary Hash value of the same data block, and a field number is calculated.

In S340, a location conflict list is created and used for recording the same field number.

In S350, the field number is compared with the field number in the location conflict list, and it is searched whether the same field number is stored in the location conflict list.

In S360, if the field number does not exist in the location conflict list, the primary Hash value is written into the corresponding block number and the field number.

As shown in FIG. 3B, the index file 221 comprises a plurality of location blocks, each location block further comprises a plurality of storage fields, and each storage field records a primary Hash value corresponding to the data block. The storage fields in the index file 221 have fixed lengths. The number of the storage fields is generated through Formula 1 below in the present invention:

$N$=location block capacity/storage field capacity    Formula 1; and

N: the number of the storage fields.

The number of the location fields is generated through Formula 2:

$M$=the number of the data blocks/$N$    Formula 2; and

M: the number of the location blocks.

The index file 221 is divided into a plurality of location blocks with a fixed capacity (the description is given with M location blocks below). A first Hash procedure is performed on the primary Hash value (obtained through an SHA 1 or an SHA 256 algorithm) corresponding to the data block, so the block number scatters in the range of M block numbers. For this purpose, a mod operation can be performed on the primary Hash value, so a remainder of the primary Hash value may be ensured to fall in the range of the M block numbers (as shown in FIG. 3B, used for selecting a corresponding location block). The Hash value generated by the first Hash procedure is merely used for storage allocation of the Hash value, so the calculation result (the block number) does not occupy practical memory and hard disk space.

Next, a second Hash procedure is performed on the primary Hash value, which is used for using a generated second Hash value as the field number of the corresponding data block. The field number is used for marking a certain field in the block number. Similarly, in order to enable the field number to scatter in the range of N storage fields (as shown in FIG. 3B, used for selecting a corresponding storage field), a mod operation may be performed on the primary Hash value. After the mod N operation of the primary Hash value, a remainder of the primary Hash value merely scatters in the range of N storage fields. In this way, the creation of the index file 221 is completed.

Figure 4:
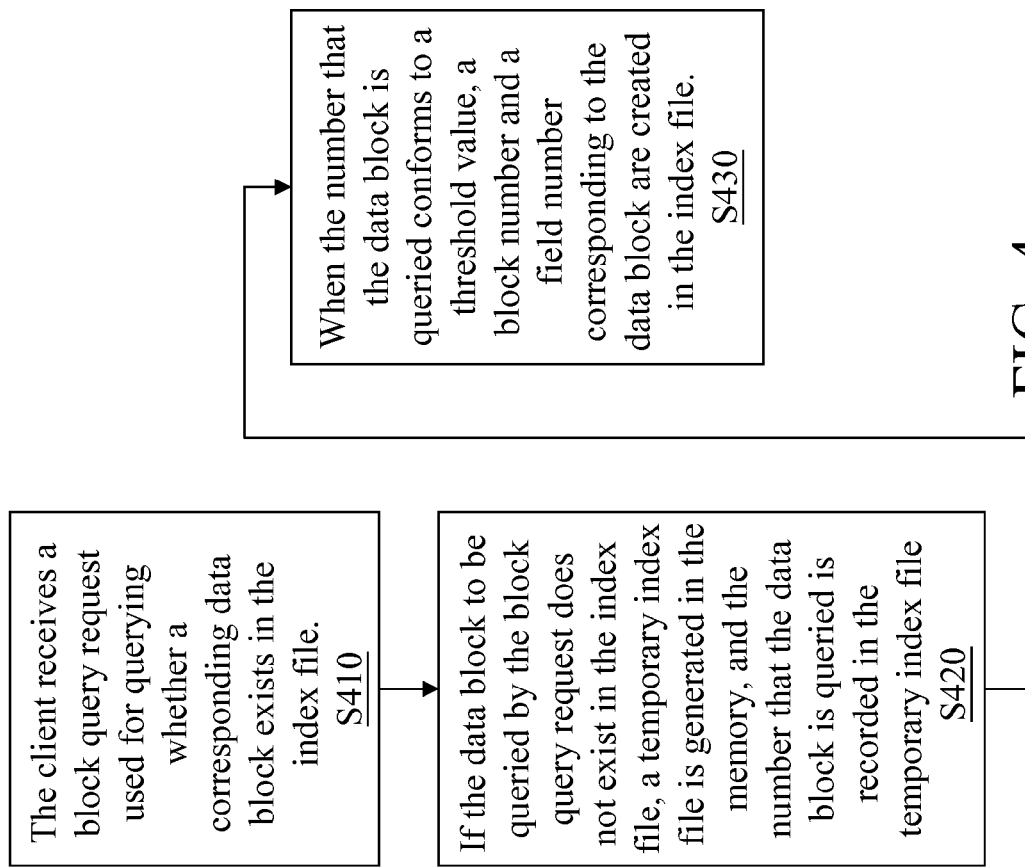
FIG. 4 is a schematic flow chart of querying an index file according to the present invention.

FIG. 4 is a schematic flow chart of a method for querying the index file 221 according to the present invention. The query of the index file 221 comprises the following steps.

In S410, a client receives a block query request, which is used for querying whether a corresponding data block exists in an index file.

In S420, if the data block to be queried by the block query request does not exist in the index file, a temporary index file is generated in the memory, and the number that the data block is queried is recorded in the temporary index file.

In S430, when the number that the data block is queried conforms to a threshold value, a block number and a field number corresponding to the data block are created in the index file.

First, the client 210 sends a query request for an input file to the server 220, and the server 220 compares the input file according to the index file to find whether the same data block already exists in the server 220.

If the second Hash value to be queried already exists in the index file 221 (that is, the primary Hash value after the second Hash procedure), the field number of the primary Hash value is saved in the location conflict list 222. The field number is recorded in the location conflict list 222, and the data block corresponding to the field number is recorded through an address pointer. In other words, in a chain table recording mode, each record has one field for recording a record number of a next record having the same primary Hash value. If this field value is recorded after the record mark without conflict, this record number may be set to an invalid value.

If the second Hash value has repetition conflict with previous primary Hash values, the Hash procedure is performed on the primary Hash value again and the primary Hash value is scattered in the location conflict list 222. The processing procedure of a chain table of the present invention may be implemented through the following manners. It is assumed that a mod N operation is performed on the primary Hash value, the item number of the location conflict list 222 is N, and refer to Table 1 at the same time.

TABLE 1

| Location Conflict List | | |
|---|---|---|
| Record number | Primary Hash value | Record mark |
| 1 | Primary Hash value 1 | N + 1 |
| 2 | Primary Hash value 2 | Invalid value 0 |
| 3 | Primary Hash value 3 | Invalid value 0 |
| N | Primary Hash value N | Invalid value 0 |
| N + 1 | Primary Hash value N + 1 | N + 3 |
| N + 2 | Primary Hash value N + 2 | Invalid value 0 |
| N + 3 | Primary Hash value N + 3 | Invalid value 0 |

First, after a remainder of the mod N operation is obtained from the "primary Hash value 1", the second Hash value thereof is stored into a first record of the location conflict list 222. However, the second Hash value after the remainder of the mod N operation is obtained from the "primary Hash value N+1" also corresponds to the first record, so repetition conflict occurs.

At this time, the first record already has content (the content thereof is the "primary Hash value 1"), and the two primary Hash values are different ("primary Hash value 1" and "primary Hash value N+1" respectively). Therefore, the second Hash value of the "primary Hash value N+1" is added at an end portion of the location conflict list 222, and the record number thereof, the "primary Hash value N+1", is recorded in the first record for correlation.

Similarly, it is assumed that the "primary Hash value N+3" also has conflict with the "primary Hash value N+1" after obtaining the remainder of N, the recorded conflict record number "N+1" is compared with the "primary Hash value N+1", and the primary Hash values are also different, and are added into the location conflict list 222. The record number, "primary Hash value N+3", is recorded in the "primary Hash value N+1" for correlation. The process of adding the record mark "N+2" is the same. The record number "invalid value 0" in the location conflict list 222 represents that no conflict record exists after this record.

When the queried primary Hash value is new data, the action of writing into the hard disk is not performed at once, and instead the primary Hash value is first saved in the cache. The server 220 performs a counting action, and the action of writing into the hard disk is performed when the value of the new data exceeds the threshold value, or the capacity of the cache exceeds a certain size. In this way, frequent disk-write actions are avoided.

A hierarchical index file 221 is used for recording the location of the data block according to the present invention, so that an access efficiency of searching for the index file 221 in a memory (or a hard disk) during a data de-duplication procedure is improved.

What is claimed is:

1. A method for creating a index of the data blocks, applicable in a data de-duplication procedure and used for creating a corresponding index file for a data block generated after a segmentation procedure of the data de-duplication procedure, and the method comprising:

loading an index file, wherein the index file comprises a plurality of location blocks, each location block further comprises a plurality of storage fields, and each storage field records a primary Hash value corresponding to the data block;

performing a first Hash procedure on the primary Hash value of the data block to calculate and generate a block number;

performing a second Hash procedure on the primary Hash value of the same data block to calculate and generate a field number;

creating a location conflict list, so as to record the same field number;

comparing the field number with the field numbers in the location conflict list to search whether the same field number is stored in the location conflict list; and writing the primary Hash value into the corresponding block number and field number if the field number does not exist in the location conflict list.

2. The method for creating a index of the data blocks according to claim 1, if the field number exists in the location conflict list, and the method further comprising:

recording the field number in the location conflict list, and recording the data block corresponding to the field number through an address pointer.

3. The method for creating a index of the data blocks according to claim 1, after the index file is completed, and the method further comprising:

receiving a block query request, used for querying whether the corresponding data block exists in the index file;

generating a temporary index file in a memory, and recording the number that the data block is queried in the temporary index file, if the data block to be queried by the block query request does not exist in the index file; and creating the block number and the field number corresponding to the data block in the index file when the number that the data block is queried conforms to a threshold value.

* * * * *